United States Patent
Endo

(10) Patent No.: US 9,160,196 B2
(45) Date of Patent: Oct. 13, 2015

(54) COMMUNICATION APPARATUS AND OPERATION METHOD THEREOF

(71) Applicant: Renesas Electronics Corporation, Kawasaki-shi, Kanagawa (JP)

(72) Inventor: Takefumi Endo, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 251 days.

(21) Appl. No.: 13/952,592

(22) Filed: Jul. 27, 2013

(65) Prior Publication Data

US 2014/0035521 A1 Feb. 6, 2014

(30) Foreign Application Priority Data

Aug. 1, 2012 (JP) ................................. 2012-171240

(51) Int. Cl.
*H02J 7/00* (2006.01)
*H02J 7/02* (2006.01)
*H02J 5/00* (2006.01)

(52) U.S. Cl.
CPC ........ *H02J 7/025* (2013.01); *H02J 5/005* (2013.01)

(58) Field of Classification Search
CPC .................................. H02J 5/005; H02J 7/025
USPC ........................................................ 320/108
See application file for complete search history.

(56) References Cited

U.S. PATENT DOCUMENTS

| 2009/0021219 | A1* | 1/2009 | Yoda et al. | 320/137 |
| 2010/0311327 | A1 | 12/2010 | Hamada | |
| 2013/0234658 | A1* | 9/2013 | Endo et al. | 320/108 |
| 2014/0239889 | A1* | 8/2014 | Endo | 320/108 |
| 2014/0306649 | A1* | 10/2014 | Akiyoshi et al. | 320/107 |
| 2014/0306650 | A1* | 10/2014 | Akiyoshi et al. | 320/107 |
| 2015/0008755 | A1* | 1/2015 | Sone | 307/104 |
| 2015/0048786 | A1* | 2/2015 | Katsumata et al. | 320/108 |
| 2015/0091510 | A1* | 4/2015 | Iwawaki et al. | 320/108 |

FOREIGN PATENT DOCUMENTS

JP  2009-253649 A  10/2009

\* cited by examiner

*Primary Examiner* — Suchin Parihar
(74) *Attorney, Agent, or Firm* — Miles & Stockbridge P.C.

(57) ABSTRACT

A communication apparatus includes a communication coil, a power receiving portion, a charge control portion, a first switch portion, a second switch portion, a communication circuit, and a processor. A voltage detection circuit of the power receiving portion generates first control signal of first state when a terminal voltage of the communication coil exceeds power supply threshold voltage. The first switch portion is controlled to turn on between first terminal and third terminal in response to first control signal. The voltage detection circuit generates second control signal of third state when a terminal voltage of the communication coil exceeds first and second charge threshold voltages during a period to charge the secondary cell. The second switch portion is controlled to turn off in response to second control signal.

20 Claims, 6 Drawing Sheets

COMMUNICATION APPARATUS AND OPERATION METHOD THEREOF

CROSS-REFERENCE TO RELATED APPLICATIONS

The disclosure of Japanese Patent Application No. 2012-171240 filed on Aug. 1, 2012 including the specification, drawings and abstract is incorporated herein by reference in its entirety.

BACKGROUND

The present invention relates to a communication apparatus and an operation method thereof. More particularly, the invention relates to a technology that effectively enables communication circuit operation during wireless charging of a battery mounted on a communication apparatus and prevents destruction of the communication circuit during a period to charge a secondary cell.

According to a related art technology, an IC card is mounted with a semiconductor integrated circuit and an antenna coil. To supply power for the IC card, the antenna coil receives an RF signal from a read/write apparatus referred to as a card reader/writer and a rectifier circuit rectifies the RF signal. The IC card having no power supply is widely used for automatic ticket systems, electronic money, and commodity distribution management. The IC card is also referred to as an RFID card because the IC card is RF-powered and stores unique identification information (ID information) in built-in nonvolatile memory. The IC card targeted for automatic ticket systems and electronic money uses Near Field Communication (NFC) using the RF frequency of 13.56 MHz.

On the other hand, a wireless charging system is also used on the increase. A potable device such as a smartphone can be charged when it is just placed on a special charging table without the need to couple a power cable to the portable device. The wireless charging system satisfies the need for large power consumption of smartphones as multifunctional mobile telephones. Smartphones have high affinity with the Internet and provide multifunctional mobile telephones that are based on personal computer functions and are provided with PDA capabilities in addition to telephone and e-mail capabilities. The wireless charging system is based on the Qi international standard developed by the Wireless Power Consortium (WPC). A transmission device and a reception device each have a coil to enable power supply to the reception device from the transmission device according to electromagnetic induction. The wireless charging system advantageously eliminates the need to plug or unplug a power connector for charging and omits operation of opening and closing a power supply connector cover on a portable device.

According to FIG. 2 and the related disclosure in patent document 1, the NFC is performed between a port device and a mobile device. The port device performs non-contact power transfer to charge a secondary cell (battery) of the mobile device. The mobile device includes an NFC induction coil and a charging induction coil. The NFC induction coil is coupled to an NFC chip. The charging induction coil is coupled to a charging power reception portion, a charge controller, and a secondary cell. The port device includes an NFC induction coil and a charging induction coil. The NFC induction coil is coupled to an NFC chip. The charging induction coil is coupled to a charging power supply portion.

According to FIG. 7 and the related disclosure in patent document 1, another non-contact power transfer system is described. The NFC is performed between the port device and the mobile device. The port device charges the secondary cell of the mobile device. The mobile device includes one induction coil used for the NFC and charging. The induction coil is coupled to a circuit selector. The circuit selector is coupled to the NFC chip and the charging power reception portion. The circuit selector selects one of the NFC chip and the charging power reception portion. The selected one is coupled to the induction coil through the circuit selector. The port device includes one induction coil used for the NFC and charging. The induction coil is coupled to a circuit selector. The circuit selector is coupled to the NFC chip and a charging power supply portion. The circuit selector selects one of the NFC chip and the charging power supply portion. The selected one is coupled to the induction coil through the circuit selector.

Patent Document 1: Japanese Unexamined Patent Publication No. 2009-253649

SUMMARY

Prior to the present invention, the inventors developed wireless or non-contact charger systems for secondary cells (batteries) mounted on portable communication devices such as smartphones.

In the development, the inventors first examined past portable communication devices and charging systems.

Before the advent of smartphones, mobile telephones are also mounted with an antenna coil and an NFC chip for the NFC to enable applied functions such as automatic ticket systems and electronic money. Accordingly, the smartphone is mounted with the antenna coil and the NFC chip for the NFC to follow earlier mobile telephone systems. However, the earlier NFC power is sufficient to just operate the antenna coil and the NFC chip and is insufficient to charge the secondary cell (battery) mounted on the mobile telephone.

The Qi standard developed by WPC uses frequencies ranging from 100 KHz to 200 KHz much lower than the RF frequency of 13.56 MH for the NFC. Smartphones and similar mobile telephones need to be mounted with an antenna capable of receiving low frequencies compliant with the Qi standard in addition to another antenna coil for the earlier NFC in order to be able to use secondary cell charging systems compliant with wireless charging systems according to the Qi standard. As a result, smartphones and similar mobile telephones need to be mounted with two types of antennas. Through the examination prior to the present invention, the inventors found it difficult to ensure a space to mount these antennas.

During the development, two-way authentication was requested to determine whether an electronic device mounted with the secondary cell needs to be charged before charging the secondary cell compliant with the wireless charging system. However, the Qi standard developed by WPC allows only one-way communication from a power receiving system to a power supply system. Through the examination prior to the present invention, the inventors also found that the Qi standard does not support the bidirectional communication between both systems needed to enable the two-way authentication.

According to FIG. 7 and the related disclosure in patent document 1, the mobile device is mounted with one induction coil used for the NFC and charging. The circuit selector selectively couples the induction coil to the NFC chip and the charging power reception portion. According to this charging system, the induction coil is not coupled from the NFC chip while the circuit selector couples the induction coil to the charging power reception portion to charge the secondary cell. As a result, the NFC chip is supplied with operating voltage only from the secondary cell. If charging from the secondary cell is insufficient, however, the operating voltage from the secondary cell is also insufficient, disabling the NFC chip from operating. In the course of the development, there was a request to operate the NFC chip during a period to charge the secondary cell and allow the charging power reception portion to process the information about secondary cell charging. For example, the information indicates that the charging power is too low or high and needs to be increased or decreased. Through the examination prior to the present invention, the inventors found that the above-mentioned charging system disables the NFC chip from processing the charging information during a period to charge the secondary cell if the secondary cell is insufficiently charged. Through the examination, the inventors also found that the above-mentioned charging system disables the charging information processing because only the circuit selector is coupled to switch between the NFC chip and the charging power reception portion and there is no path to transmit the charging information between them.

Through the examination, the inventors further found that the voltage at a communication coil terminal increases up to approximately 100 to 200 volts during a period to charge the secondary cell and finally destroys the NFC chip.

The following describes means to solve these problems. These and other objects and novel features of the invention may be readily ascertained by referring to the following description and appended drawings.

The following summarizes representative embodiments of the invention disclosed in this application.

A communication apparatus (1) according to a representative embodiment includes a communication coil (11), a power receiving portion (12), a charge control portion (13), a first switch portion (18), a second switch portion (15), a communication circuit (16), and a processor (17).

A voltage detection circuit (121) of the power receiving portion (12) generates a first control signal (Cnt1) of first state (H) when a terminal voltage of the communication coil (11) exceeds a specified power supply threshold voltage (Vth0).

The first switch portion (18) is controlled to turn on between a first terminal (T1) and a third terminal (T3) in response to the first control signal (Cnt1) of first state (H).

The voltage detection circuit (121) generates a second control signal (Cnt2) of third state (L) when a terminal voltage of the communication coil (11) exceeds charge threshold voltages (VthH and VthL) higher than the specified power supply threshold voltage (Vth0) during a period to charge a secondary cell (14).

The second switch portion (15) is controlled to turn off in response to the second control signal (Cnt2) of third state (L).

The following summarizes an effect provided by the representative aspects of the invention disclosed in this application.

The communication apparatus (1) enables communication circuit operation during wireless charging of a battery mounted on the communication apparatus and prevents destruction of the communication circuit during a period to charge a secondary cell.

DETAILED DESCRIPTION

1. Embodiment Overview

Figure 1:
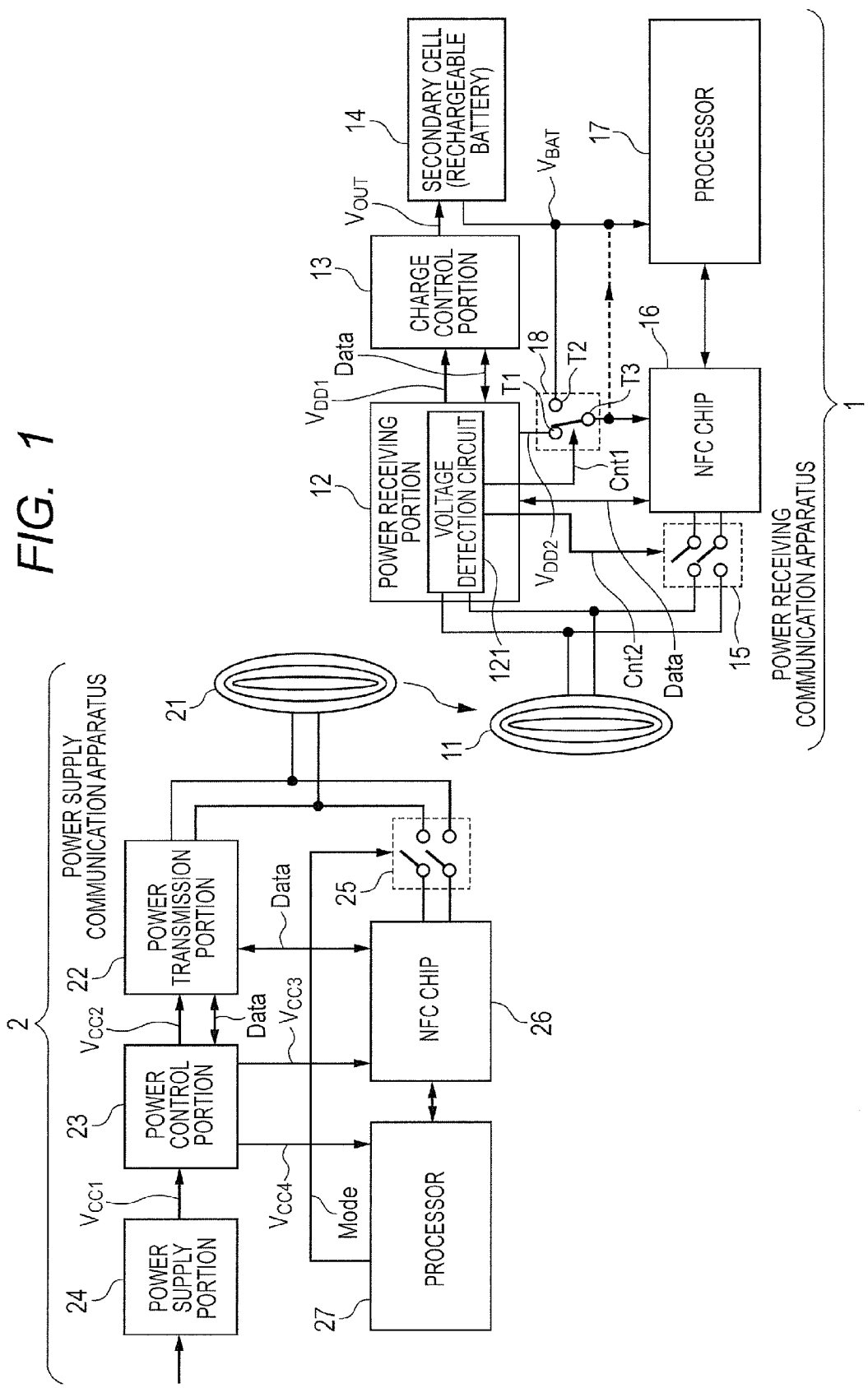
FIG. 1 illustrates how a power receiving communication portion 1 according to a first embodiment performs non-contact communication and non-contact charging on a power supply communication portion 2.

The following summarizes representative embodiments of the invention disclosed in this application. The description uses parenthesized reference numerals in the accompanying drawings. The reference numerals just indicate examples of the concept of elements to which the reference numerals are assigned.

[1] A communication apparatus (1) according to a representative embodiment includes a communication coil (11), a power receiving portion (12), a charge control portion (13), a first switch portion (18), a second switch portion (15), a communication circuit (16), and a processor (17).

The communication coil (11) receives a transmission signal transmitted from another communication apparatus (2).

The power receiving portion (12) generates power-supply voltage ($V_{DD}$) from the transmission signal received by the communication coil (11).

The charge control portion (13) is connectable to a secondary cell (14).

The charge control portion (13) can charge the secondary cell (14) using the power-supply voltage ($V_{DD}$).

The communication coil (11) is connectable to a transmission/reception terminal of the communication circuit (16) via the second switch portion (15).

The processor (17) is coupled to the communication circuit (16).

The power-supply voltage ($V_{DD}$) is supplied to a first terminal (T1) of the first switch portion (18). A battery voltage ($V_{BAT}$) of the secondary cell (14) can be supplied to a second terminal (T2) of the first switch portion (18). A third terminal (T3) of the first switch portion (18) is coupled to the communication circuit (16).

The power receiving portion (12) includes a voltage detection, circuit (121) that responds to a terminal voltage of the communication coil (11).

The voltage detection circuit (121) generates the first control signal (Cnt1) of first state (H) when the terminal voltage of the communication coil (11) exceeds the specified power supply threshold voltage (Vth0).

The first switch portion (18) is controlled to turn on between the first terminal (T1) and the third terminal (T3) in response to the first control signal (Cnt1) of first state (H).

The voltage detection circuit (121) generates the first control signal (Cnt1) of second state (L) different from the first state (H) when the terminal voltage of the communication coil (11) does not exceed the specified power supply threshold voltage.

The first switch portion (18) is controlled to turn on between the second terminal (T2) and the third terminal (T3) in response to the first control signal (Cnt1) of the second state (L).

The voltage detection circuit (121) generates a second control signal (Cnt2) of third state (L) when the terminal voltage of the communication coil (11) exceeds charge threshold voltages (VthH and VthL) higher than the specified power supply threshold voltage (Vth0) during a period to charge the secondary cell (14).

The second switch portion (15) is controlled to turn off in response to the second control signal (Cnt2) of the third state (L).

The voltage detection circuit (121) generates the second control signal (Cnt2) of fourth state (L) different from the third state (H) when the terminal voltage of the communication coil (11) does not exceed the charge threshold voltages higher than the specified power supply threshold voltage.

The second switch portion (15) is controlled to turn on in response to the second control signal (Cnt2) of the fourth state (H).

The communication circuit (16) is communicable with the other communication apparatus (2) while the second switch portion (15) is controlled to turn on (see FIG. 1).

The embodiment enables communication circuit operation during a period to charge the battery mounted on the communication apparatus according to wireless charging and is capable of preventing the communication circuit from being destroyed during a period to charge the secondary cell.

According to a preferred embodiment, the charge threshold, voltages (VthH and VthL) include the first charge threshold voltage (VthL) and the second charge threshold voltage (VthH). The first charge threshold voltage (VthL) is higher than the specified power supply threshold voltage (Vth0). The second charge threshold voltage (VthH) is higher than the first charge threshold voltage (VthL).

The voltage detection circuit (121) generates the second control signal (Cnt2) of the third state (L) when the terminal voltage of the communication coil (11) exceeds the second charge threshold voltage (VthH) during the period to charge the secondary cell (14).

The voltage detection circuit (121) generates the second control signal (Cnt2) of the fourth state (L) different from the third state (H) when the terminal voltage of the communication coil (11) is lower than the first charge threshold voltage (VthL).

Figure 3:
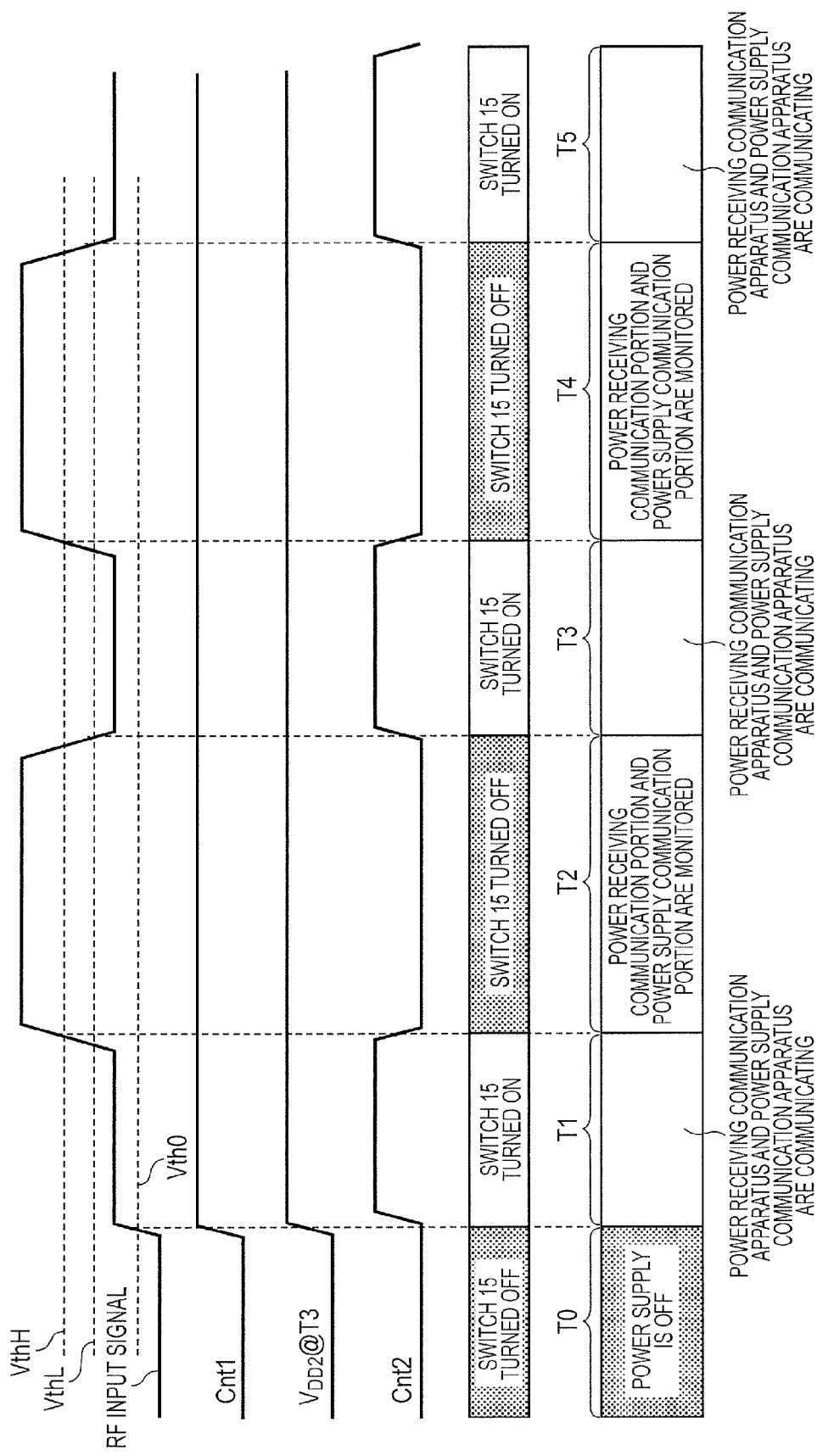
FIG. 3 illustrates waveform operation of the power receiving communication portion 1 according to the first embodiment illustrated in FIGS. 1 and 2.

According to another preferred embodiment, the communication circuit (16) uses the communication coil (11) to be able to communicate with the other communication apparatus (2) during communication periods (T1, T3, and T5) during which the second switch portion (15) is controlled to turn on in response to the second control signal (Cnt2) (see FIG. 3).

According to still another preferred embodiment, the power receiving portion (12), the charge control portion (13), and the communication circuit (16) are coupled to each other through wiring that transfers the information about charging of the secondary cell (14).

During the communication periods (T1, T3, and T5), the communication circuit (16) is capable of communicating the information about charging of the secondary Cell (14) with the other communication apparatus (2).

According to yet another preferred embodiment, the charge control portion (13) is capable of charging the secondary cell (14) using the power-supply voltage ($V_{OUT}$) during charging periods (T2 and T4) of the secondary cell (14). The second switch portion (15) is controlled to turn off in response to the second control signal (Cnt2) of the third state (L) (see FIG. 3).

According to still yet another preferred embodiment, the communication circuit (16) can operate on the power-supply voltage ($V_{DD}$) supplied to the third terminal (T3) of the first switch portion (18) during the charging periods (T2 and T4) (see FIG. 3).

According to yet still another preferred embodiment, the processor (17) is coupled to the third terminal (T3) of the first switch portion (18).

During the charging periods (T2 and T4), the processor (17) can operate on the power-supply voltage ($V_{DD}$) supplied to the third terminal (T3) of the first switch portion (18) (see FIG. 3).

According to still yet another preferred embodiment, the communication circuit (16) can communicate with the other communication apparatus (2) according to the NFC during the communication periods (T1, T3, and T5) (see FIG. 1).

According to yet still another preferred embodiment, the second switch portion (15) includes enhancement type field-effect transistors (Q1 through Q9) whose current pathways are coupled in series between a first port (P1) coupled to the communication coil (11) and a second port (P2) coupled to the communication circuit (16).

Figure 4:
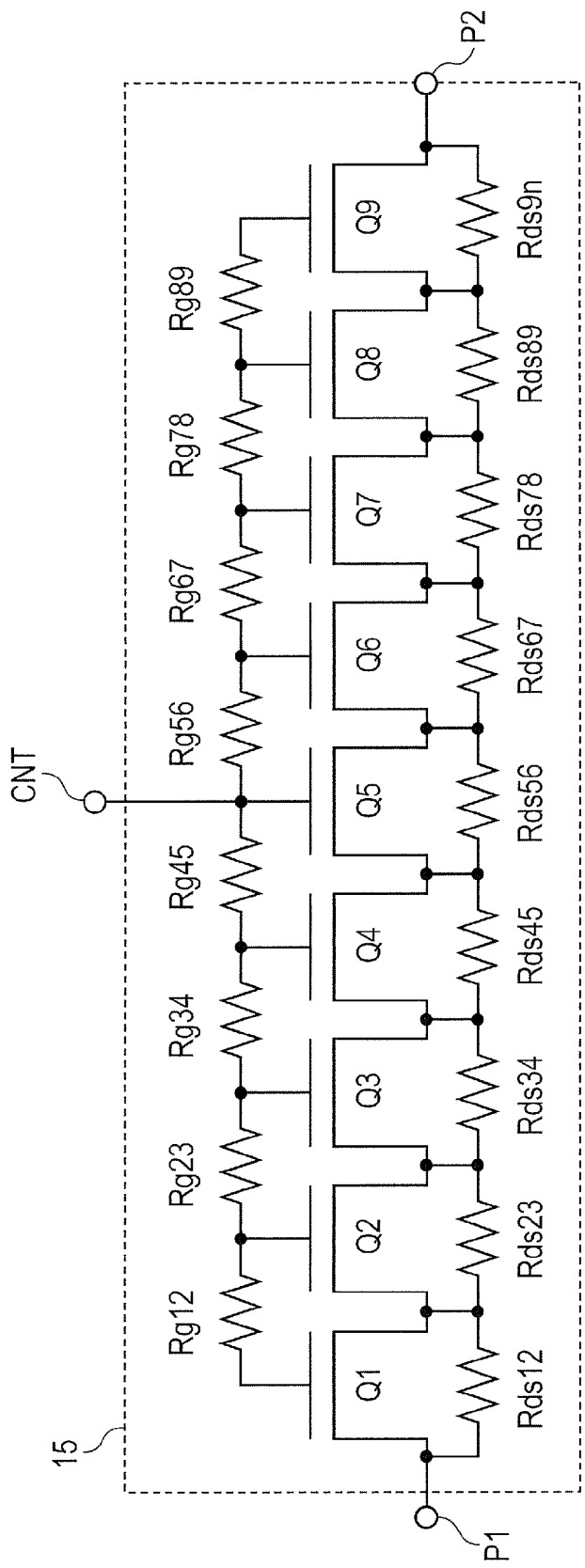
FIG. 4 illustrates MOS transistors configuring a second switch portion 15 coupled between an NFC coil 11 and an NFC chip 16 of the power receiving communication portion 1 according to the first embodiment illustrated in FIGS. 1 and 2.

The second control signal (Cnt2) generated from the voltage detection circuit (121) is supplied to gates of the enhancement type field-effect transistors (Q1 through Q9) (see FIG. 4).

According to a specific embodiment, the second switch portion (15) includes PIN diodes (D1 through D8) coupled in series between the first port (P1) coupled to the communication coil and the second port (P2) coupled to the communication circuit.

According to another specific embodiment, the second switch portion (15) includes MEMS switches (SW1 through SW6) coupled in series between the first port (P1) coupled to the communication coil and the second port (P2) coupled to the communication circuit.

[2] A representative embodiment according to another aspect provides an operation method of the communication apparatus (1) including the communication coil (11), the power receiving portion (12), the charge control portion (13), the first switch portion (18), the second switch portion (15), the communication circuit (16), and the processor (17).

The communication coil (11) receives a transmission signal transmitted from another communication apparatus (2).

The power receiving portion (12) generates power-supply voltage ($V_{DD}$) from the transmission signal received by the communication coil (11).

The charge control portion (13) is connectable to a secondary cell (14).

The charge control portion (13) can charge the secondary cell (14) using the power-supply voltage ($V_{DD}$).

The communication coil (11) is connectable to a transmission/reception terminal of the communication circuit (16) via the second switch portion (15).

The processor (17) is coupled to the communication circuit (16).

The power-supply voltage ($V_{DD}$) is supplied to a first terminal (T1) of the first switch portion (18). A battery voltage ($V_{BAT}$) of the secondary cell (14) can be supplied to the second terminal (T2) of the first switch portion (18). The third terminal (T3) of the first switch portion (18) is coupled to the communication circuit (16).

The power receiving portion (12) includes the voltage detection circuit (121) that responds to a terminal voltage of the communication coil (11).

The voltage detection circuit (121) generates the first control signal (Cnt1) of first state (H) when the terminal voltage of the communication coil (11) exceeds the specified power supply threshold voltage (Vth0).

The first switch portion (18) is controlled to turn on between the first terminal (T1) and the third terminal (T3) in response to the first control signal (Cnt1) of first state (H).

The voltage detection circuit (121) generates the first control signal (Cnt1) of second state (L) different from the first state (H) when the terminal voltage of the communication coil (11) does not exceed the specified power supply threshold voltage.

The first switch portion (18) is controlled to turn on between the second terminal (T2) and the third terminal (T3) in response to the first control signal (Cnt1) of the second state (L).

The voltage detection circuit (121) generates the second control signal (Cnt2) of third state (L) when the terminal voltage of the communication coil (11) exceeds charge threshold voltages (VthH and VthL) higher than the specified power supply threshold voltage (Vth0) during a period to charge the secondary cell (14).

The second switch portion (15) is controlled to turn off in response to the second control signal (Cnt2) of the third state (L).

The voltage detection circuit (121) generates the second control signal (Cnt2) of fourth state (L) different from the third state (H) when the terminal voltage of the communication coil (11) does not exceed the charge threshold voltages higher than the specified power supply threshold voltage.

The second switch portion (15) is controlled to turn on in response to the second control signal (Cnt2) of the fourth state (H).

The communication circuit (16) is communicable with the other communication apparatus (2) while the second switch portion (15) is controlled to turn on (see FIG. 1).

2. Detailed Description of the Embodiments

The embodiments will be described in further detail. Throughout the drawings for illustrating the preferred embodiments, parts having the same functions described in the previous drawings are generally designated by the same reference numerals and a repetitive description is omitted for simplicity.

1. First Embodiment

Non-Contact Communication and Non-Contact Charging

FIG. 1 illustrates how a power receiving communication portion 1 according to the first embodiment performs non-contact communication and non-contact charging on a power supply communication portion 2.

The power receiving communication portion 1 illustrated in FIG. 1 is mounted on mobile telephones such as smartphones. The power receiving communication portion 1 performs the NFC as a specific non-contact communication system to enable electronic payment such as automatic ticket systems and electronic money. The power receiving communication portion 1 performs non-contact charging on a secondary cell (battery) using an antenna for NFC as the same specific non-contact communication system.

Configuration of the Power Receiving Communication Portion

As illustrated in FIG. 1, the power receiving communication portion 1 according to the first embodiment includes an NFC coil 11, a power receiving portion 12, a charge control portion 13, a secondary cell 14, a first switch portion 18, a second switch portion 15, an NFC chip 16, and a processor 17. The processor 17 may be otherwise configured as a large-scale semiconductor integrated circuit including the processor 17.

The NFC coil 11 is directly coupled to an input terminal of the power receiving portion 12 through wiring on a wiring substrate in a mobile telephone. On the other hand, the NFC coil 11 is coupled to a transmission/reception terminal of the NFC chip 16 via the second switch portion 15. The NFC coil 11 receives induced power from the power supply communication portion 2 for non-contact charging of the secondary cell. The power receiving portion 12 rectifies, smoothes, and converts the induced power into power-supply voltages $V_{DD1}$ and $V_{DD2}$. The power-supply voltage $V_{DD1}$ generated from the power receiving portion 12 is supplied to the secondary cell 14 via the charge control portion 13. The power-supply voltage $V_{DD2}$ generated from the power receiving portion 12 is supplied to the NFC chip 16 and the processor 17 via a first terminal T1 and a third terminal T3 of the first switch portion 18. The charge control portion 13 fully charges the secondary cell 14 to be set to battery voltage $V_{BAT}$ that can be supplied to the NFC chip 16 via a second terminal T2 and the third terminal T3 of the first switch portion 18.

The power receiving portion 12 contains a voltage detection circuit 121 that detects a terminal voltage of the NFC coil 11. The voltage detection circuit 121 generates a high-level first control voltage Cnt1 when the terminal voltage exceeds the power supply threshold voltage Vth0. The first switch portion 18 is controlled to turn on between the first terminal T1 and the third terminal T3 in response to the high-level first control voltage Cnt1. The first switch portion 18 is controlled to turn on between the second terminal T2 and the third terminal T3 while the voltage detection circuit 121 generates the low-level first control voltage Cnt1.

The power receiving portion 12 is coupled to the charge control portion 13 and the NFC chip 16 through wiring on a wiring substrate in a mobile telephone. Therefore, the power receiving portion 12 can transmit data concerning charging of the secondary cell 14 to the charge control portion 13 and the NFC chip 16. The data contains data indicating the secondary cell 14 charged too low or high and data related to two-way authentication for charging.

The terminal voltage of the NFC coil 11 reaches as high as 100 to 200 volts during a period to charge the secondary cell 14. The voltage detection circuit 121 detects that the terminal voltage exceeds high charge threshold value VthH. The voltage detection circuit 121 generates low-level second control voltage Cnt2. The second switch portion 15 is controlled to turn off in response to low-level second control voltage Cnt2. The second switch portion 15 can prevent the NFC chip 16 from being destroyed due to the high terminal voltage of 100 to 200 volts of the NFC coil 11 during a period to charge the secondary cell 14.

The terminal voltage of the NFC coil 11 drops below a high voltage of 100 to 200 volts during a period not to charge the secondary cell 14. The voltage detection circuit 121 detects that the terminal voltage drops below low charge threshold value VthL. The voltage detection circuit 121 then generates high-level second control voltage Cnt2. The second switch portion 15 is controlled to turn on in response to high-level second control voltage Cnt2. The NFC chip 16 is then capable of NFC with the power supply communication portion 2 for transmission and reception operations using the NFC coil 11.

The processor 17 represents an application processor mounted on mobile telephones such as smartphones. The processor 17 is coupled to nonvolatile flash memory, a display device such as LCD, and an input/output device such as a numerical keypad in order to enable the NFC with the power supply communication portion 2. The nonvolatile flash memory stores electronic payment information according to the NFC to make the display device and the input/output device available for the electronic payment according to the NFC. The relation of Vth0<VthL<VthH is predetermined among power supply threshold voltage Vth0, low charge threshold value VthL, and high charge threshold value VthH for the power receiving portion 12.

Configuration of the Power Supply Communication Portion

As illustrated in FIG. 1, the power supply communication portion 2 includes an NFC coil 21, a power transmission portion 22, a power control portion 23, a power supply portion 24, a third switch portion 25, an NFC chip 26, and a processor 27.

The power supply communication portion 2 illustrated in FIG. 1 includes the non-contact charging function for the secondary cell 14 of the power receiving communication portion 1 in addition to the NFC function of the read/write apparatuses referred to as card reader/writers for IC cards of the related art.

The NFC coil 21 is directly coupled to an output terminal of the power transmission portion 22 through wiring. The NFC coil 21 is also coupled to a transmission/reception terminal of the NFC chip 26 via the third switch portion 25. The power supply portion 24 is supplied with commercial power-supply voltage to generate induced power that is transmitted by the NFC coil 21 and is used for non-contact charging on the secondary cell 14 of the power receiving communication portion 1. Consequently, power-supply voltage Vcc1 is generated from the power supply portion 24 and is supplied as power-supply voltage Vcc2 to the power transmission portion 22 via the power control portion 23. Further, the power control portion 23 generates power-supply voltages Vcc3 and Vcc4 that are supplied to the NFC chip 26 and the processor 27, respectively.

The power transmission portion 22 is coupled to the power control portion 23 and the NFC chip 26 through wiring. Therefore, the power transmission portion 22 can transmit data concerning charging of the secondary cell 14 to the power control portion 23 and the NFC chip 26. The data contains data indicating the secondary cell 14 charged too low or high and data related to two-way authentication for charging.

The terminal voltage of the NFC coil 21 in the power supply communication portion 2 reaches as high as 100 to 200 volts during a period to charge the secondary cell 14 in the power receiving communication portion 1. The processor 27 uses low-level operation mode signal Mode to control the third switch portion 25 to turn off. As a result, the third switch portion 25, when turned off, can prevent the NFC chip 26 from being destroyed due to the high terminal voltage of 100 to 200 volts of the NFC coil 11 during a period to charge the secondary cell 14 in the power receiving communication portion 1.

The processor 27 uses high-level operation mode signal Mode to control the third switch portion 25 to turn off during a period not to charge the secondary cell 14 in the power receiving communication portion 1. The NFC chip 26 is then capable of NFC with the power receiving communication portion 1 for transmission and reception operations using the NFC coil 21.

The processor 27 processes electronic payment information from the power receiving Communication portion 1 and transmits processing results to various financial institutions via communication paths such as the Internet.

Detailed Configuration of the power receiving communication portion

Figure 2:
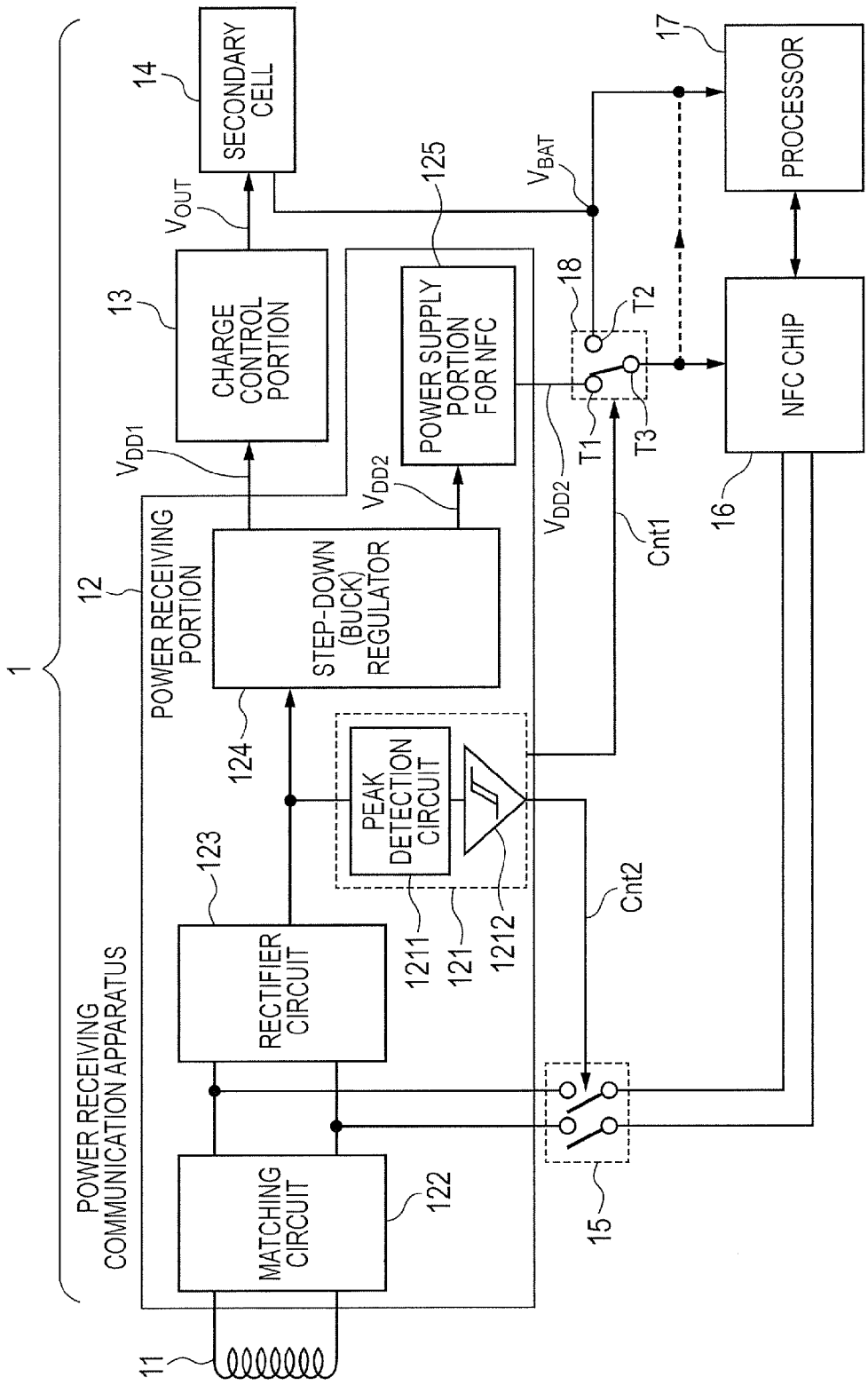
FIG. 2 illustrates a detailed configuration of the power receiving communication portion 1 according to the first embodiment illustrated in FIG. 1.

FIG. 2 illustrates a detailed configuration of the power receiving communication portion 1 according to the first embodiment illustrated in FIG. 1.

As illustrated in FIG. 2, the power receiving portion 12 in the power receiving communication portion 1 includes a voltage detection circuit 121, a matching circuit 122, a rectifier circuit 123, a step-down (buck) regulator 124, and a power supply portion 125 for NFC.

Input terminals of the matching circuit 122 are coupled to both ends of the NFC coil 11. The matching circuit 122 performs impedance matching between the NFC coil 11 and the rectifier circuit 123. The matching circuit 122 generates an RF signal. The rectifier circuit 123 rectifies the RF signal according to full-wave rectification. A rectifier output signal rectified by the rectifier circuit 123 is supplied to the voltage detection circuit 121 and the step-down (buck) regulator 124. The rectifier circuit 123 generates a direct-current voltage of a relatively high voltage level. From the direct-current voltage, the step-down (buck) regulator 124 generates power-supply voltages $V_{DD}1$ and $V_{DD}2$ of relatively low voltage levels and supplies them to the charge control portion 13 and the power supply portion 125 for NFC respectively.

The voltage detection circuit 121 detects a terminal voltage of the NFC coil 11 by monitoring the rectifier output signal generated from the rectifier circuit 123. Consequently, the voltage detection circuit 121 generates high-level first control voltage Cnt1 when the rectifier output signal from the rectifier circuit 123 exceeds power supply threshold voltage Vth0. The first switch portion 18 is controlled to turn on between the first terminal T1 and the third terminal T3 in response to high-level first control voltage Cnt1.

The first switch portion 18 may be configured to turn on between the second terminal T2 and the third terminal T3 according to a predetermined default setting when the power receiving portion 12 is not supplied with the RF power and does not operate.

As illustrated in FIG. 2, the voltage detection circuit 121 includes a peak detection circuit 1211 and a hysteresis voltage comparator 1212. The peak detection circuit 1211 detects the peak level of a smoothed output signal generated from the rectifier circuit 123. The hysteresis voltage comparator 1212 compares the peak level detected by the peak detection circuit 1211 with low charge threshold value VthL and high charge threshold value VthH described above.

The hysteresis voltage comparator 1212 detects that the peak level detected by the peak detection circuit 1211 exceeds high charge threshold value VthH. The detection circuit 121 then generates low-level second control voltage Cnt2. The second switch portion 15 is controlled to turn off in response to low-level second control voltage Cnt2. The second switch portion 15 can prevent the NFC chip 16 from being destroyed due to the high terminal voltage of 100 to 200 volts of the NFC coil 11 during a period to charge the secondary cell 14.

The terminal voltage of the NFC coil 11 drops below a high voltage of 100 to 200 volts during a period not to charge the secondary cell 14. The voltage detection circuit 121 detects that the peak level detected by the peak detection circuit 1211 drops below low charge threshold value VthL. The voltage detection circuit 121 then generates high-level second control voltage Cnt2. The second switch portion 15 is controlled to turn on in response to high-level second control voltage Cnt2.

The NFC chip 16 is then capable of NFC with the power supply communication portion 2 for transmission and reception operations using the NFC coil 11.

According to the above-mentioned description, the wireless charging uses the carrier frequency of 13.56 MHz same as the NFC carrier frequency. However, the present invention is not limited thereto. The wireless charging can use the other carrier frequencies such as 6.78 MHz that can be received by adjusting the matching circuit 122. The carrier frequency is not limited to 13.56 MHz.

Operation of the Power Receiving Communication Portion

FIG. 3 illustrates waveform operation of the power receiving communication portion 1 according to the first embodiment illustrated in FIGS. 1 and 2.

From the top to the bottom of FIG. 3, the first waveform represents an RF input signal that is received by the NFC coil 11 in the power receiving communication portion 1 and corresponds to induced power from the power supply communication portion 2. The waveform includes power supply threshold value Vth0, low charge threshold value VthL, and high charge threshold value VthH detected by the voltage detection circuit 121.

The second waveform in FIG. 3 represents first control voltage Cnt1 supplied to the first switch portion 18 from the voltage detection circuit 121. First control voltage Cnt1 changes from the low level to the high level when the peak level of the first RF input signal in FIG. 3 exceeds power supply threshold value Vth0. This controls the first switch portion 18 to turn on between the first terminal T1 and the third terminal T3. Accordingly, power-supply voltage $V_{DD}2$ generated from the power receiving portion 12 enables to operate the NFC chip 16 and the processor 17 in the power receiving communication portion 1.

The third waveform in FIG. 3 represents power-supply voltage $V_{DD}2$ supplied to the third terminal T3 of the first switch portion 18 from the power receiving portion 12. The level of power-supply voltage $V_{DD}2$ changes from the low level, that is, ground voltage level, to the high level when the peak level of the first RF input signal in FIG. 3 exceeds power supply threshold value Vth0.

The fourth waveform in FIG. 3 represents second control voltage Cnt2 supplied to the second switch portion 15 from the voltage detection circuit 121.

During initial period T0, the RF input signal as the first waveform in FIG. 3 and the power-supply voltage $V_{DD}2$ as the third waveform in FIG. 3 are set to the zero level. The second control voltage Cnt2 generated from the voltage detection circuit 121 is also set to the zero level or the low level. A fifth diagram in FIG. 3 illustrates that the low-level second control voltage Cnt2 controls the second switch portion 15 to turn off. As a result, a sixth diagram in FIG. 3 illustrates that the power is off during initial period T0.

During first period T1 after initial period T0, the RF input signal as the first waveform in FIG. 3 is lower than the low charge threshold value VthL. The voltage detection circuit 121 generates the high-level second control voltage Cnt2. As the fifth diagram in FIG. 3 illustrates, the second switch portion 15 is controlled to turn on in response to the high-level second control voltage Cnt2. As a result, as the sixth diagram in FIG. 3 illustrates, first period T1 enables the NFC between the power receiving communication portion 1 and the power supply communication portion 2 using the on-state second switch portion 15 and the NFC coil 11.

During second period T2 after first period T1, the RF input signal as the first waveform in FIG. 3 is higher than the high charge threshold value VthH. The voltage detection circuit 121 generates the low-level second control voltage Cnt2. As the fifth diagram in FIG. 3 illustrates, the second switch portion 15 is controlled to turn off in response to the low-level second control voltage Cnt2. During second period T2, the power-supply voltage $V_{DD}2$ supplied to third terminal T3 from the power receiving portion 12 is set to the high level. As the sixth drawing in FIG. 3 illustrates, the NFC chip 16 and the processor 17 in the power receiving communication portion 1 are enabled by the power-supply voltage $V_{DD}2$ to operate and process data.

During third period T3 and fifth period T5, the RF input signal as the first waveform in FIG. 3 is lower than the low charge threshold value VthL. The voltage detection circuit 121 generates the high-level second control voltage Cnt2. As the fifth diagram in FIG. 3 illustrates, the second switch portion 15 is controlled to turn on in response to the high-level second control voltage Cnt2. As a result, as the sixth diagram in FIG. 3 illustrates, third period T3 and fifth period T5 enable the NFC between the power receiving communication portion 1 and the power supply communication portion 2 using the on-state second switch portion 15 and the NFC coil 11.

During fourth period T4 similarly to second period T2, the RF input signal as the first waveform in FIG. 3 is higher than the high charge threshold value VthH. The voltage detection circuit 121 generates the low-level second control voltage Cnt2. As the fifth diagram in FIG. 3 illustrates, the second switch portion 15 is controlled to turn off in response to the low-level second control voltage Cnt2. During fourth period T4, the power-supply voltage $V_{DD}2$ supplied to third terminal T3 from the power receiving portion 12 is set to the high level. As the sixth drawing in FIG. 3 illustrates, the NFC chip 16 and the processor 17 in the power receiving communication portion 1 are enabled by the power-supply voltage $V_{DD}2$ to operate and process data.

As seen from FIG. 3, periods T1, T3, and T5 for active NFC and secondary cell non-charging and periods T2 and T4 for inactive NFC and secondary cell charging alternately occur under time sharing control.

First period T1, third period T3, and fifth period T5 enable NFC between the power receiving communication portion 1 and the power supply communication portion 2 using the on-state second switch portion 15 and the NFC coil 11. As a result, the NFC can be performed between the power receiving communication portion 1 and the power supply communication portion 2 to transmit the information about charging of the secondary cell 14, two-way authentication data for charging, and electronic payment information. During the period for active NFC and secondary cell non-charging, the power receiving communication portion 1 can access various data and information using the Internet environment for the power supply communication portion 2. The NFC can be also used to authenticate wireless LAN connection between the power supply communication portion 2 and the power receiving communication portion 1 in order to use the Internet environment for the power supply communication portion 2 based on the wireless LAN such as Wireless Fidelity (Wi-Fi).

During second period T2 and fourth period T4, the second switch portion 15 is controlled to turn off in response to the low-level second control voltage Cnt2. The NFC is disabled between the power receiving communication portion 1 and the power supply communication portion 2. During the period for inactive NFC and secondary cell charging, the power-supply voltage $V_{DD}2$ supplied from the power receiving portion 12 enables to operate the NFC chip 16 and the processor 17 in the power receiving communication portion 1. The NFC chip 16 and the processor 17 process various data to monitor states of the power receiving portion 12 and the charge control portion 13. That is, the NFC chip 16 and the processor 17 can process data transmitted during next periods T1, T3, and T5 for active NFC and secondary cell non-charging. The NFC chip 16 and the processor 17 also perform various application programs stored in the nonvolatile flash memory.

Configuration of the First Switch Portion Using MOS Transistors

FIG. 4 illustrates MOS transistors configuring the second switch portion 15 coupled between the NFC coil 11 and the NFC chip 16 of the power receiving communication portion 1 according to the first embodiment illustrated in FIGS. 1 and 2.

As illustrated in FIG. 4, the first port P1 and the second port P2 of the second switch portion 15 are coupled to the NFC coil 11 and the NFC chip 16, respectively. Control terminal CNT of the second switch portion 15 is supplied with the second control voltage Cnt2 generated from the voltage detection circuit 121. The first port 21 of the second switch portion 15 is exactly coupled to the NFC coil 11 via a coupling capacitor.

A voltage of 100 to 200 volts between the terminals of the NFC coil 11 may be supplied between a first port P1 and a second port P2 of the second switch portion 15. In consideration of this, the second switch portion 15 includes nine N-channel MOS transistors Q1 through Q9 coupled in series between the first port P1 and the second port P2. Resistors Rds12, Rds23, Rds34, . . . , and Rds9n are coupled between the source and the drain of N-channel MOS transistors Q1 through Q9. Each of the resistors has a high resistance value of approximately 100 K. As a result, equal direct-current potential can be applied to the source and the drain of each of the N-channel MOS transistors Q1 through Q9.

The gate resistor Rg12 having a resistance value of several kilohms is coupled between the N-channel MOS transistors Q1 and Q2. The gate resistor Rg23 having a resistance value of several kilohms is coupled between the N-channel MOS transistors Q2 and Q3. The gate resistors Rg34 through Rg89 are similarly coupled to the N-channel MOS transistors Q3 through Q9. A common connection node between the gate resistors Rg45 and R56 is coupled to a control terminal CNT for the second switch portion 15.

The eight gate resistors Rg12 through Rg89 prevent insulation breakdown of gate insulators for the N-channel MOS transistors Q3 through Q9. The gate resistors suppress a voltage applied to gate insulators for the N-channel MOS transistors Q1 through Q9 below the gate breakdown voltage even if a voltage of 100 to 200 volts between the terminals of the NFC coil 11 is supplied between the first port P1 and the second port P2 of the second switch portion 15.

Enhancement type MOS field-effect transistors may be used for the nine N-channel MOS transistors Q1 through Q9 included in the second switch portion 15. As a result, the low-level second control voltage Cnt2 generated from the voltage detection circuit 121 can reliably control to turn off the second switch portion 15 during initial period TO, second period T2, and fourth period T4. The high-level second control voltage Cnt2, when set to higher than a positive threshold voltage for the enhancement type MOS field-effect transistors as the nine N-channel MOS transistors Q1 through Q9, controls the second switch portion 15 to turn on.

Configuration of the First Switch Portion Using PIN Diodes

Figure 5:
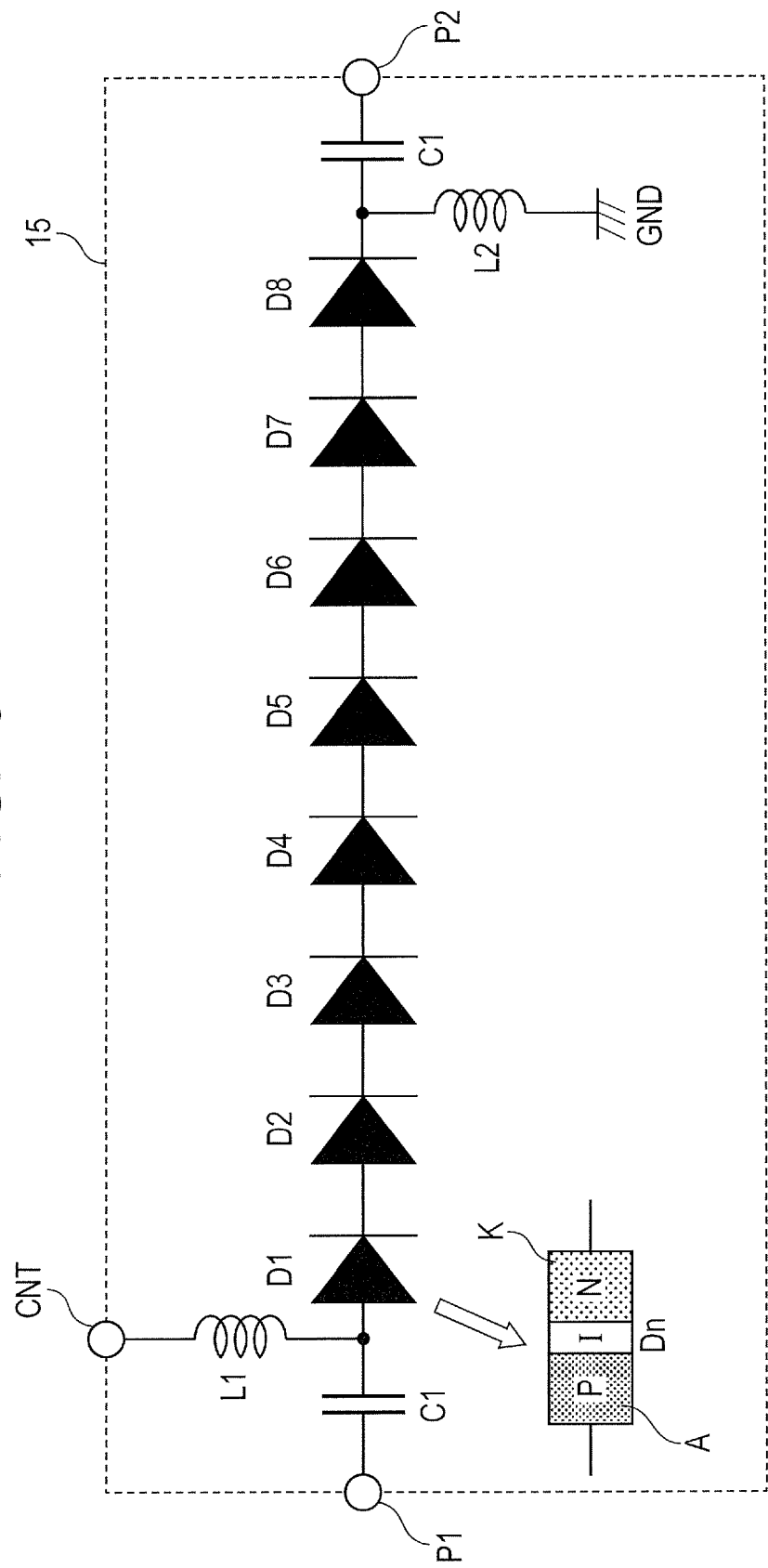
FIG. 5 illustrates PIN diodes configuring a second switch portion 15 coupled between an NFC coil 11 and an NFC chip 16 of the power receiving communication portion 1 according to the first embodiment illustrated in FIGS. 1 and 2.

FIG. 5 illustrates PIN diodes configuring the second switch portion 15 coupled between the NFC coil 11 and the NFC chip 16 of the power receiving communication portion 1 according to the first embodiment illustrated in FIGS. 1 and 2.

As illustrated in FIG. 5, the first port P1 and the second port P2 of the second switch portion 15 are coupled to the NFC coil 11 and the NFC chip 16, respectively. Control terminal CNT of the second switch portion 15 is supplied with the second control voltage Cnt2 generated from the voltage detection circuit 121.

The first port P1 couples with one end of a first coupling capacitor C1. A first inductor L1 is coupled between control terminal CNT and the other end of the first coupling capacitor C1. The other end of the first coupling capacitor C1 couples with anode A of a first PIN diode D1. Cathode K of the first PIN diode D1 couples with anode A of a second PIN diode D2. Cathode K of the second PIN diode D2 couples with anode A of a third PIN diode D3. Cathode K of the third PIN diode D3 couples with anode A of a fourth PIN diode D4. Cathode K of the fourth PIN diode D4 couples with anode A of a fifth PIN diode D5. Cathode K of the fifth PIN diode D5 couples with anode A of a sixth PIN diode D6. Cathode K of the sixth PIN diode D6 couples with anode A of a seventh PIN diode D7. Cathode K of the seventh PIN diode D7 couples with anode A of an eighth PIN diode D8. Cathode K of the eighth PIN diode D8 couples with ground potential GND through a second inductor L2 and couples with one end of a second coupling capacitor C2. The other second coupling capacitor C2 couples with the second port P2.

As illustrated in FIG. 5, each of the eight PIN diodes D1 through D8 includes a P-type semiconductor region P used as anode A, an N-type semiconductor region N used as cathode K, and an intrinsic semiconductor region I formed between anode A and cathode K.

As already known, a depletion layer of the intrinsic semiconductor region I in each of the PIN diodes D1 through D8 provides off state between both terminals if zero bias is applied between both terminals. The off state is also observed between both terminals if a reverse bias voltage is applied between both terminals. If a large forward bias voltage is applied between both terminals, the PIN diodes D1 through D8 cause too small forward diode resistance to enable on state between both terminals. As illustrated in FIG. 5, the second switch portion 15 includes the PIN diodes D1 through D8. Applying a large positive control voltage to control terminal CNT of the second switch portion 15 provides on state between the first port P1 and the second port P2 of the second switch portion 15. Applying ground potential GND to control terminal CNT of the second switch portion 15 provides off state between the first port P1 and the second port P2 of the second switch portion 15.

Configuration of the First Switch Portion Using MEMS Switches

Figure 6:
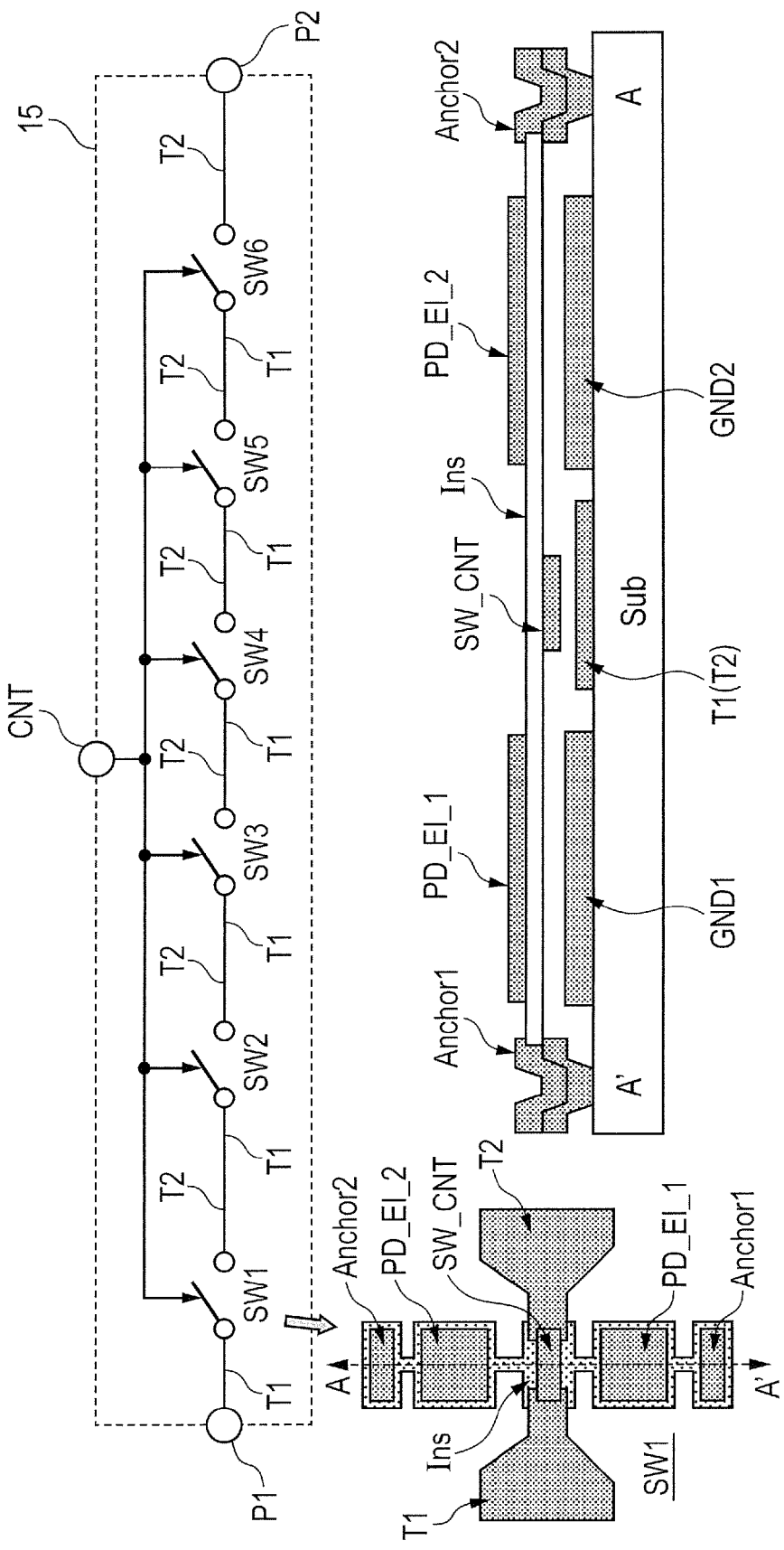
FIG. 6 illustrates MEMS switches configuring a second switch portion 15 coupled between an NFC coil 11 and an NFC chip 16 of the power receiving communication portion 1 according to the first embodiment illustrated in FIGS. 1 and 2.

FIG. 6 illustrates MEMS switches configuring the second switch portion 15 coupled between the NFC coil 11 and the NFC chip 16 of the power receiving communication portion 1 according to the first embodiment illustrated in FIGS. 1 and 2. MEMS is an acronym for Micro Electro Mechanical Systems.

As illustrated in FIG. 6, the first port P1 and the second port P2 of the second switch portion 15 are coupled to the NFC coil 11 and the NFC chip 16, respectively. Control terminal CNT of the second switch portion 15 is supplied with the second control voltage Cnt2 generated from the voltage detection circuit 121.

The first port P1 couples with first terminal T1 of a first MEMS switch SW1. Second terminal T2 of the first MEMS switch SW1 couples with first terminal T1 of a second MEMS switch SW2. Second terminal T2 of the second MEMS switch SW2 couples with first terminal T1 of a third MEMS switch SW3. Second terminal T2 of the third MEMS switch SW3 couples with first terminal T1 of a fourth MEMS switch SW4. Second terminal T2 of the fourth MEMS switch SW4 couples with first terminal T1 of a fifth MEMS switch SW5. Second terminal T2 of the fifth MEMS switch SW5 couples with first terminal T1 of a sixth MEMS switch SW6. Second terminal T2 of the sixth MEMS switch SW6 couples with the second port P2. Control terminals for the six MEMS switches SW1 through SW6 couple with control terminal CNT of the second switch portion 15.

As seen from a plan view in FIG. 6, each of the MEMS switches SW1 through SW6 includes switch contact SW_CNT capable of contacting with first terminal T1 and second terminal T2 and pull-down electrodes PD_EL1 and PD_EL2 and anchors Anchor1 and Anchor2 capable of pulling down insulator thin film Ins according to electrostatic induction. As seen from a sectional view in FIG. 6, first terminal T1, second terminal T2, first ground electrode GND1, and second ground electrode GND2 are formed on the main surface of substrate Sub. Insulator thin film Ins is formed over first terminal T1, second terminal T2, first ground electrode GND1, and second ground electrode GND2.

Switch contact SW_CNT is formed over first terminal T1 and second terminal T2 on the rear surface of insulator thin film Ins. First pull-down electrode PD_EL1 is formed over first ground electrode GND1 on the upper surface of insulator thin film Ins. Second pull-down electrode PD_EL2 is formed over second ground electrode GND2 on the upper surface of insulator thin film Ins. First anchor Anchor1 and second Anchor2 fix both ends of insulator thin film Ins to the main surface of substrate Sub.

For example, supplying positive voltage to control terminal CNT of the second switch portion 15 charges first pull-down electrode PD_EL1 and second pull-down electrode PD_EL2 to positive voltage in relation to the ground potential for first ground electrode GND1 and second ground electrode GND2. As a result, the electrostatic induction pulls first pull-down electrode PD_EL1 and second pull-down electrode PD_EL2 down onto the main surface of substrate Sub. Switch contact SW_CNT formed on the lower surface of insulator thin film Ins electrically contacts with first terminal T1 and second terminal T2 formed on the main surface of substrate Sub. On the other hand, supplying the ground potential to control terminal CNT of the second switch portion 15 generates no electrostatic induction. Switch contact SW_CNT formed on the lower surface of insulator thin film Ins does not electrically contact with first terminal T1 and second terminal T2 formed on the main surface of substrate Sub.

While there have been described specific preferred embodiments of the present invention, it is to be distinctly understood that the present invention is not limited thereto but may be otherwise variously embodied within the spirit and scope of the invention.

For example, the third switch portion 25 in the power supply communication portion 2 may be configured according to the structures illustrated in FIGS. 4, 5, and 6.

The second switch portion 15 illustrated in FIG. 4 uses serially coupled N-channel enhancement type MOS field-effect transistors. In addition, the second switch portion 15 may use an N-channel enhancement type MES field-effect transistor whose gate electrode is formed of a Schottky barrier. MES is a short for Metal Semiconductor.

What is claimed is:

1. A communication apparatus comprising:
   a communication coil;
   a power receiving portion;
   a charge control portion;
   a first switch portion;
   a second switch portion;
   a communication circuit; and
   a processor,
   wherein the communication coil receives a transmission signal transmitted from another communication apparatus;
   wherein the power receiving portion generates a power-supply voltage from the transmission signal received by the communication coil;
   wherein the charge control portion is connectable to a secondary cell;
   wherein the charge control portion is capable of charging the secondary cell using the power-supply voltage;
   wherein the communication coil is coupled to a transmission/reception terminal of the communication circuit via the second switch portion;
   wherein the processor is coupled to the communication circuit;
   wherein a first terminal of the first switch portion is supplied with the power-supply voltage;
   wherein a second terminal of the first switch portion is capable of being supplied with battery voltage;
   wherein a third terminal of the first switch portion couples with the communication circuit;
   wherein the power receiving portion includes a voltage detection circuit responding to terminal voltage of the communication coil;
   wherein the voltage detection circuit generates a first control signal of a first state when the terminal voltage of the communication coil exceeds a specified power supply threshold voltage;
   wherein the first switch portion is controlled to turn on between the first terminal and the third terminal in response to the first control signal of the first state;
   wherein the voltage detection circuit generates the first control signal of a second state different from the first state when the terminal voltage of the communication coil does not exceed the specified power supply threshold voltage;
   wherein the first switch portion is controlled to turn on between the second terminal and the third terminal in response to the first control signal of the second state;
   wherein the voltage detection circuit generates the second control signal of a third state during a period to charge the secondary cell when the terminal voltage of the communication coil exceeds a charge threshold voltage higher than the specified power supply threshold voltage;
   wherein the second switch portion is controlled to turn off in response to the second control signal of the third state;
   wherein the voltage detection circuit generates the second control signal of a fourth state different from the third state when the terminal voltage of the communication coil does not exceed the charge threshold voltage higher than the specified power supply threshold voltage;
   wherein the second switch portion is controlled to turn on in response to the second control signal of the fourth state; and
   wherein the communication circuit is capable of communicating with the other communication apparatus during a period in which the second switch portion is controlled to turn on.

2. The communication apparatus according to claim 1,
   wherein the charge threshold voltage includes a first charge threshold voltage higher than the specified power supply threshold voltage and a charge threshold voltage higher than the first charge threshold voltage;
   wherein the voltage detection circuit generates the second control signal of the third state during the period to charge the secondary cell when the terminal voltage of the communication coil exceeds the second charge threshold voltage; and wherein the voltage detection circuit generates the second control signal of the fourth state different from the third state when the terminal voltage of the communication coil becomes lower than the first charge threshold voltage.

3. The communication apparatus according to claim 2, wherein the communication circuit is capable of communicating with the other communication apparatus using the communication coil during a communication period in which the second switch portion is controlled to turn on in response to the second control signal of the fourth state.

4. The communication apparatus according to claim 3, wherein the power receiving portion, the charge control portion, and the communication circuit are coupled through wiring that transfers information about charging of the secondary cell; and wherein the communication circuit is capable of communicating the information about charging of the secondary cell with the other communication apparatus during the communication period.

5. The communication apparatus according to claim 4, wherein the charge control portion is capable of charging the secondary cell using the power-supply voltage and the second switch portion is controlled to turn off in response to the second control signal of the third state during the period to charge the secondary cell.

6. The communication apparatus according to claim 5, wherein the communication circuit is operable during the charging period using the power-supply voltage supplied to a third terminal of the first switch portion.

7. The communication apparatus according to claim 6, wherein the processor is coupled to a third terminal of the first switch portion; and wherein the processor is operable during the charging period using the power-supply voltage supplied to a third terminal of the first switch portion.

8. The communication apparatus according to claim 7, wherein the communication circuit is capable of NFC with the other communication apparatus during the communication period.

9. The communication apparatus according to claim 8, wherein the second switch portion includes a plurality of enhancement type field-effect transistors having current pathways coupled in series between a first port coupled to the communication coil and a second port coupled to the communication circuit; and wherein the second control signal generated from the voltage detection circuit is supplied to a plurality of gates of the plurality of enhancement type field-effect transistors.

10. The communication apparatus according to claim 8, wherein the second switch portion includes a plurality of PIN diodes coupled in series between a first port coupled to the communication coil and a second port coupled to the communication circuit.

11. The communication apparatus according to claim 8, wherein the second switch portion includes a plurality of MEMS switches coupled in series between a first port coupled to the communication coil and a second port coupled to the communication circuit.

12. A method of operating a communication apparatus including a communication coil, a power receiving portion, a charge control portion, a first switch portion, a second switch portion, a communication circuit, and a processor, the method comprising:

wherein the communication coil receives a transmission signal transmitted from another communication apparatus;

wherein the power receiving portion generates a power-supply voltage from the transmission signal received by the communication coil;

wherein the charge control portion is connectable to a secondary cell;

wherein the charge control portion is capable of charging the secondary cell using the power-supply voltage;

wherein the communication coil is coupled to a transmission/reception terminal of the communication circuit via the second switch portion;

wherein the processor is coupled to the communication circuit;

wherein a first terminal of the first switch portion is supplied with the power-supply voltage;

wherein a second terminal of the first switch portion is capable of being supplied with battery voltage;

wherein a third terminal of the first switch portion couples with the communication circuit;

wherein the power receiving portion includes a voltage detection circuit responding to terminal voltage of the communication coil;

wherein the voltage detection circuit generates a first control signal of a first state when the terminal voltage of the communication coil exceeds a specified power supply threshold voltage;

wherein the first switch portion is controlled to turn on between the first terminal and the third terminal in response to the first control signal of the first state;

wherein the voltage detection circuit generates the first control signal of a second state different from the first state when the terminal voltage of the communication coil does not exceed the specified power supply threshold voltage;

wherein the first switch portion is controlled to turn on between the second terminal and the third terminal in response to the first control signal of the second state;

wherein the voltage detection circuit generates the second control signal of a third state during a period to charge the secondary cell when the terminal voltage of the communication coil exceeds a charge threshold voltage higher than the specified power supply threshold voltage;

wherein the second switch portion is controlled to turn off in response to the second control signal of the third state;

wherein the voltage detection circuit generates the second control signal of a fourth state different from the third state when the terminal voltage of the communication coil does not exceed the charge threshold voltage higher than the specified power supply threshold voltage;

wherein the second switch portion is controlled to turn on in response to the second control signal of the fourth state; and wherein the communication circuit is capable of communicating with the other communication apparatus during a period in which the second switch portion is controlled to turn on.

13. The method of operating the communication apparatus according to claim 12, wherein the charge threshold voltage includes a first charge threshold voltage higher than the specified power supply threshold voltage and a charge threshold voltage higher than the first charge threshold voltage;

wherein the voltage detection circuit generates the second control signal of the third state during the period to charge the secondary cell when the terminal voltage of the communication coil exceeds the second charge threshold voltage; and wherein the voltage detection circuit generates the second control signal of the fourth state different from the third state when the terminal voltage of the communication coil becomes lower than the first charge threshold voltage.

14. The method of operating the communication apparatus according to claim 13, wherein the communication circuit is capable of communicating with the other communication apparatus using the communication coil during a communication period in which the second switch portion is controlled to turn on in response to the second control signal of the fourth state.

15. The method of operating the communication apparatus according to claim 14, wherein the power receiving portion, the charge control portion, and the communication circuit are coupled through wiring that transfers information about charging of the secondary cell; and wherein the communication circuit is capable of communicating the information about charging of the secondary cell with the other communication apparatus during the communication period.

16. The method of operating the communication apparatus according to claim 15, wherein the charge control portion is capable of charging the secondary cell using the power-supply voltage and the second switch portion is controlled to turn off in response to the second control signal of the third state during the period to charge the secondary cell.

17. The method of operating the communication apparatus according to claim 16, wherein the communication circuit is operable during the charging period using the power-supply voltage supplied to a third terminal of the first switch portion.

18. The method of operating the communication apparatus according to claim 17, wherein the processor is coupled to a third terminal of the first switch portion; and wherein the processor is operable during the charging period using the power-supply voltage supplied to a third terminal of the first switch portion.

19. The method of operating the communication apparatus according to claim 18, wherein the communication circuit is capable of NFC with the other communication apparatus during the communication period.

20. The method of operating the communication apparatus according to claim 19, wherein the second switch portion includes a plurality of enhancement type field-effect transistors having current pathways coupled in series between a first port coupled to the communication coil and a second port coupled to the communication circuit; and wherein the second control signal generated from the voltage detection circuit is supplied to a plurality of gates of the plurality of enhancement type field-effect transistors.

* * * * *